UNITED STATES PATENT OFFICE 2,463,838

POLYMERIC COLOR COUPLERS

Cyril D. Wilson, Metuchen, N. J., assignor to E. I. du Pont de Nemours & Company, Wilmington, Del., a corporation of Delaware No Drawing. Application February 18, 1943, Serial No. 476,339

4 Claims. (Cl. 95—6)

This invention relates to improvements in the art of color photography. More particularly it relates to processes of color photography wherein polymeric dye intermediates are used for the production of dye images. Still more particularly it relates to processes of color photography and photographic elements and compositions useful therefor which utilize polymeric dye intermediates which possess recurring units having dye component groups capable of reacting with a diazo compound to form an azo dye or coupling on chromogenic development of silver salt images to form a quinoneimine or azomethine dye. Still more particularly it relates to such processes, elements, and compositions wherein the polymeric dye intermediates possess recurring units containing an active acyclic methylene group in the chain of atoms of said polymers. The invention also pertains to novel dye intermediates of the above type and to their preparation and use.

An object of this invention is to provide new photographic elements and compositions containing polymeric color formers having recurring azo dye coupling components or groups. A related object is to provide photographic elements and developer compositions which contain polymeric color formers having recurring coupling components or groups which are capable of reacting with the oxidation products of color coupling developing agents to form azomethine dyes. Another object is to provide photographic color processes utilizing such dye intermediates. Still other objects are to provide photographic elements containing high molecular weight dye intermediates which do not migrate during processing. Still other objects will appear hereinafter.

It has been discovered that synthetic linear polymers which contain intralinear active methylene groups may be prepared and are useful azo dye intermediates. The synthetic linear polymeric dye intermediates contain recurring noncyclic structural units of the formula

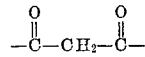

which are reactive or capable of dye condensation. The reactive methylene groups or prototropic methylene (—CH$_2$—) groups in such units are reactive by reason of the fact that the adjacent carbon atoms have attached thereto ketonic oxygen atoms. Each of such reactive methylene groups are capable of coupling (1) with diazonium salts to form azo dyes, and (2) with the oxidation products of arylene diamino compounds having a free amino group formed during the reduction of silver salts or arylene nitroso amines to form azomethine dyes, or with compounds having the quinoneimine structure to form quinoneimine dyes.

The linear polymers are compounds whose molecules are long chains built up from repeating or recurring units. This type of structure may be symbolized by the general formula:

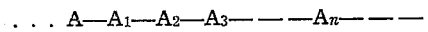

wherein the units or radicals A are the structural units of the polymer. Units A, A$_1$, A$_2$, A$_3$ each contain the reactive or prototropic methylene groups discussed above and, depending upon the nature of the starting materials, may be alike or different. They are prepared by condensation reactions of dye coupling reactive methylene derivatives having polyfunctional groups.

The condensation reactions which enable the formation of the polymeric structures may be defined as reactions which occur with organic structures or compounds, at least some of which contain reactive methylene groups, and which process with the elimination of elements, e. g., H$_2$, N$_2$, etc., or of simple molecules, e. g., H$_2$O, CH$_3$OH, C$_2$H$_5$OH, HCl, HBr, etc. To be more specific, the linear polymeric dye intermediates which contain recurring dye coupling groups, for instance, intralinear reactive methylene groups are prepared by means of condensation reactions between two or more organic molecules, each of which is polyfunctional; i. e. contains more than one group capable of condensation, and at least one of which contains at least one reactive methylene or phototropic methylene group.

Polyesters, polyamides, polyanhydrides, polyesteramides, polyetheramides, etc. containing recurring dye coupling groups, can be made by appropriate condensation reactions. Among the functional groups which are capable of the condensation reactions necessary to produce polymers are the following:

for example, a condensation reaction may be effected between a bis beta ketonic carboxylic acid dialkyl ester and a diamine with the elimination of alcohol to produce a polyamide chain:

$$nNH_2-Y_1-NH_2 + nROOC-Y_2-COOR \rightarrow (NH-Y_1-NHOC-Y_2-CO)_x + 2nROH$$

where $n$ is a whole number equal to or greater than 1, $Y_1$ and $Y_2$ are like or different bivalent organic radicals at least one of which contains a reactive methylene grouping, R is an alkyl group, and $x$ is an intermediate number dependent upon $n$ and the extent of polymerization produced by the conditions of the reaction.

Amino acid compounds containing active methylene groups such as p-aminobenzoyl acetic acid ethyl ester may be condensed with itself with the elimination of alcohol to give:

$$(-NH-Y_1-CONH-Y_2-CO-)_x$$

A bis beta ketonic acid ester containing a reactive methylene group may be condensed with a dihydroxy-diamino compound in which each hydroxyl group is adjacent to a different amino group to give:

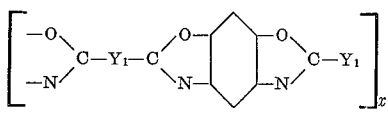

A dicarboxylic acid containing a reactive methylene group may be reacted with a dihydroxy compound to give a polymeric ester of the type:

$$(-Y_1-COO-Y_2-COO-)_x$$

A diacyl chloride containing a reactive methylene group may be reacted with a diamino compound to produce polyamide dye intermediates of the type:

$$(OC-Y_1-CONH-Y_2-NH-)_x$$

From the preceding processes, which are subject to considerable variation, it is evident that there are many reactions which may be employed to form suitable polymeric dye intermediates for the invention.

The invention is primarily concerned with the preparation and use of photographic compositions or layers comprising such dye intermediates. The polymeric dye intermediates containing recurring dye coupling groups such as reactive methylene groups can be incorporated into a coating solution such as a solvent or into colloid coating compositions utilizing binding agents such as water permeable colloids of which gelatin, albumin, gum arabic, agar agar, polyvinyl alcohol, represent practical types and deposited on a support to form a color yielding layer. They may, for example, be incorporated into a gelatino-silver halide emulsion and coated onto a film base or coated on a gelatino-silver halide emulsion layer to form a color film. A multilayer film may contain a plurality of such layers, each containing a different polymeric dye intermediate which will form a different color so that a natural color scene may be reproduced. The dye intermediate in each respective layer should form a color complementary in color to the utilized sensitivity of its respective coacting silver halide strata. The film elements can be processed to color by color coupling development steps and/or azo coupling steps. Because of their molecular weight they are immobile or fast to diffusion in such colloid layers during photographic processing.

The following examples illustrate further the nature of the invention and provide practical procedures for carrying it out. They are merely representative of various aspects of the invention but are not intended to limit it in any way:

*Example I*

A 5 g. portion of diethylene triamine was added drop by drop to a boiling solution of 10 g. of ethyl acetone dicarboxylate in 100 cc. of xylene. The resulting solution was then boiled in a flask fitted with a reflux condenser for a period of 1 hour. After this treatment, the mixture was allowed to cool and the supernatant liquid was removed by decantation. Upon treatment with boiling alcohol, the solid residue was found to be completely soluble and did not precipitate when the alcoholic solution was poured into water. When alcoholic solution was poured into ether, however, a gummy, stringy solid separated from solution. This solid was then transferred to a flask fitted with a reflux condenser and covered with 200 cc. of p-dioxane. The mixture was heated to boiling and boiled for 30 minutes. Upon cooling, a dark brown, rubbery mass of polyamide could be removed from the flask. The probable formula of the compound after purification as described can be represented as follows:

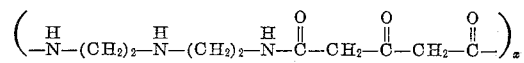

One gram of the polymer was dissolved in a solution composed of 1 cc. of 20% sodium hydroxide and 10 cc. of ethyl alcohol. When this solution was treated with tetrazotized dianisidine a strong wine-red azo dye was developed.

The dye has the following probable structure:

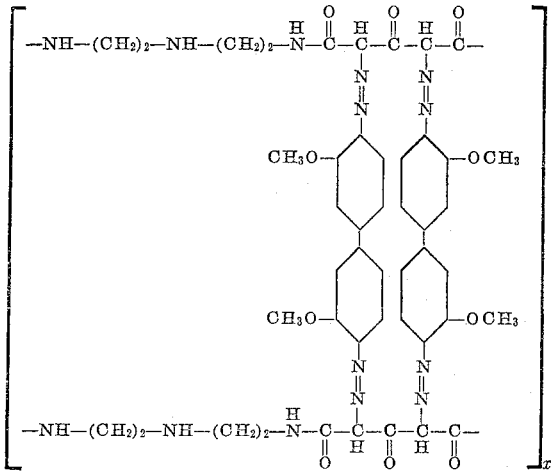

*Example II*

A 3.8 g. portion of triethylene tetramine was added drop by drop to a boiling solution of 5 g. of ethyl-acetone dicarboxylate in 100 cc. of xylene. The resulting solution was then boiled in a flask fitted with a reflux condenser for 1 hour. The mixture was allowed to cool and the supernatant liquid removed by decantation. The solid was dissolved in alcohol and the solution poured into ether. A gummy, elastic material separated from the solution and was transferred to a flask fitted with a reflux condenser where it was covered with 200 cc. of para-dioxane, and boiled with this reagent for 30 minutes. A dark, rubbery material was removed from the solution which was judged to have the following general formula:

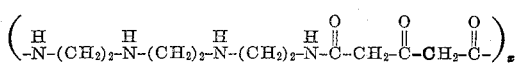

An alcoholic solution of the polymer prepared by dissolving 1 g. in 1 c. c. 20% sodium hydroxide and 10 c. c. ethyl alcohol when treated with tetrazotized dianisidine developed a clear pink azo-color.

This dye is believed to have the following general formula:

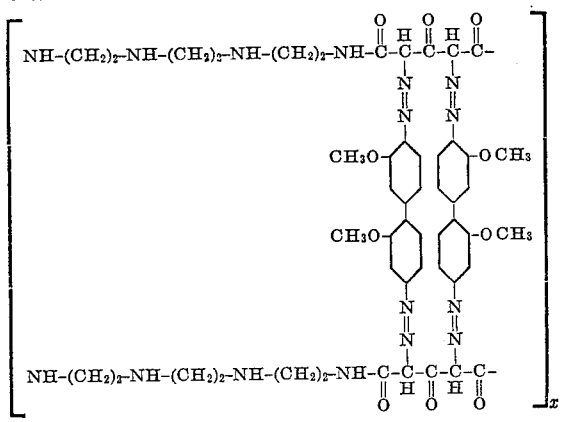

Example III

A 5.8 g. portion of pentaethylene hexamine was added drop by drop to a boiling solution of 5 grams of ethyl acetone dicarboxylate in 100 c. c. of xylene. The resulting solution was then boiled in a flask fitted with a reflux condenser for one hour. The mixture was allowed to cool and the supernatant liquid removed by decantation. The solid was dissolved in alcohol and poured into ether. A gummy, stringy solid separated from the solution. This material was then placed in a flask, fitted with a reflux condenser, covered with paradioxane and boiled in this solution for 30 minutes. At the end of this time a dark-brown, rubbery solid was removed from the solution which was judged to have the following general formula:

$$\left(-\overset{H}{\underset{|}{N}}-(CH_2)_2-\overset{H}{\underset{|}{N}}-(CH_2)_2-\overset{H}{\underset{|}{N}}-(CH_2)_2-\overset{H}{\underset{|}{N}}-(CH_2)_2-\overset{H}{\underset{|}{N}}-(CH_2)_2-\overset{H}{\underset{|}{N}}-\overset{O}{\underset{\|}{C}}-CH_2-\overset{O}{\underset{\|}{C}}-CH_2-\overset{O}{\underset{\|}{C}}-\right)_x$$

A 1 gram portion of this material was dissolved in 1 c. c. of sodium hydroxide and 10 c. c. of ethyl alcohol. The resulting solution was then treated with about 1 g. of diethyl para-phenylenediamine dissolved in the smallest possible amount of water and this was oxidized by an aqueous solution of an equivalent quantity of potassium dichromate. The compound formed was precipitated by pouring into ether and the precipitate filtered and washed. It was a strong magenta azo-methine dye thought to have the following general formula:

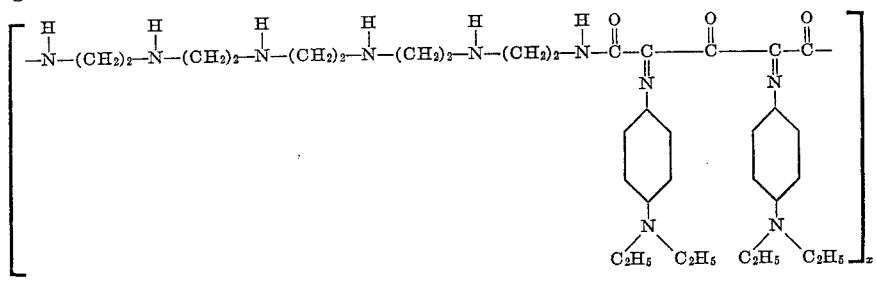

Example IV

A 3.4 g. portion of para-xylylene diamine was dissolved in 25 c. c. of warm xylene and this solution added drop by drop to a boiling solution of 5 g. of ethyl acetone dicarboxylate in 200 c. c. of boiling xylene. The resulting solution was boiled for one hour in a flask fitted with a reflux condenser. After this treatment the flask was allowed to cool and the supernatant liquid removed by decantation. Treatment with hot alcohol was used to extract the residue which remained as a "rubbery" mass, the composition of which was believed to be represented by the following general formula:

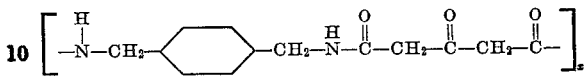

One gram of the polymer was dissolved in a solution of 1 c. c. 20% sodium hydroxide, 10 c. c. ethyl alcohol and 10 c. c. water.

The resulting solution was then treated with about 0.75 g. of diethyl paraphenylenediamine dissolved in the smallest possible amount of water and then this was oxidized by an aqueous solution of an equivalent quantity of potassium dichromate. The compound formed was precipitated, filtered, and washed. It was a strong magenta azo-methine dye thought to have the following general formula:

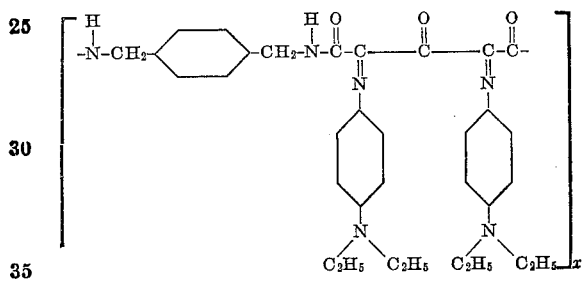

Example V

A solution was prepared composed of 6.83 c. c. of ethyl acetone dicarboxylate in 150 c. c. of xylene and heated to boiling. Five grams of triglycoldiamine were slowly introduced into the boiling solution and boiling was continued for two hours in a flask fitted with a reflux condenser. The mixture was then cooled and the supernatant liquid removed by decantation. Alcohol was added to the flask, the material scraped out and the alcohol removed by filtration and then by pressing between filter papers. The dry material was then covered by about 100 c. c. of dioxane in a clean flask fitted with a reflux condenser and boiled until practically the entire solid was dissolved. The mixture was then cooled and about 100 c. c. of ether introduced into the flask. The flask was then placed in an icebox and allowed to stand at low temperature overnight. In the morning, the supernatant liquid was removed by decantation and the yellow, viscous solid allowed to stand until hardened into a rubbery solid. The following general formula is believed to represent the constitution of the substance:

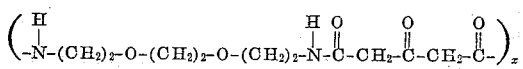

A 1 gram sample of this material was dissolved in 1 c. c. of 20% sodium hydroxide and 10 c. c. of ethyl alcohol and dispersed in about 100 c. c. of warm photographic emulsion. Upon cooling the emulsion was exposed and developed with diethyl paraphenylenediamine. A strong red-brown color was produced.

Example VI

A 10.2 g. portion of terephthaloyl bis acetic ethyl ester is dissolved in 200 c. c. of boiling xylene. Small portions of o,o'-dihydroxy benzidine are then added to this solution until 7.2 g. have been incorporated in the boiling liquid. The flask is then fitted with a reflux condenser (air-cooled) and heated to continue the boiling for about 20 minutes. At the end of this time the temperature is further raised to 200° C. and maintained at this level for 2 hours. The contents of the flask are then chilled and excess solvent removed and the product dried. After thorough extraction of impurities by treatment with some suitable solvent or by recrystallization the dye intermediate is obtained which corresponds to the following general formula:

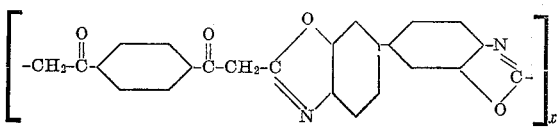

Example VII

Equivalent quantities of propanediol (1,3) and acetone dicarboxylic acid are dissolved in a suitable solvent and cooled to 5° C. The mixture is then saturated with dry hydrogen chloride in a closed container and the whole allowed to come to room temperature. After the reaction is completed, the resulting mixture is poured into ice water whereupon the desired product separates from the soluble components. Repeated washing with ice water suffices to remove the unreacted ingredients. The residue is thought to have the formula:

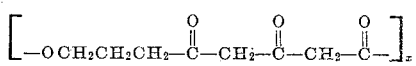

A red dye results when this compound is coupled with diazotized naphthionic acid which is thought to correspond to the following formula:

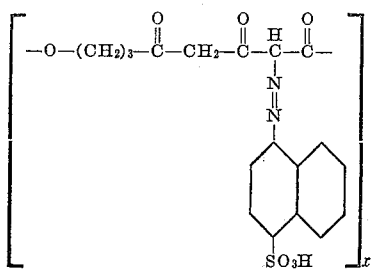

Example VIII

A 1.4 g. portion of 2,6 diaminopyridine was powdered into a boiling solution of 1.5 g. of ethyl acetone dicarboxylate in 25 cc. of xylene. A precipitate began to form immediately, but the mixture was refluxed for 2 hours in an apparatus designed to allow for the escape of the reaction product. At the end of this time the supernatant liquid was removed by decantation and the solid residue extracted with ether and then with boiling ethanol. This material was dissolved in 20% sodium hydroxide and ethanol and incorporated in a photographic silver halide emulsion. When this emulsion was exposed and developed with diethyl paraphenylenediamine a blue dye image was produced.

Example IX

A 5 g. portion of terephthaloyl bis acetic ester was dissolved in 150 cc. of boiling chlorobenzene to which was then added 0.89 g. of paraphenylenediamine followed by 1.19 g. of triglycol diamine. The mixture was refluxed for one hour, filtered while still hot and washed with hexane. The residue was then air dried and tested as a dye by treatment with diazotized metanilic acid. Coupling occurred with the formation of a yellow to red color.

Example X

A 5 g. portion of acetoacetic ester and 7.8 g. of the ethyl ester of acetone dicarboxylic acid were dissolved in 100 c. c. of boiling xylene to which was added 6.23 g. of powdered p-phenylenediamine. The mixture was refluxed for 15 minutes, the supernatant liquid removed by decantation and replaced by 100 c. c. of ethyl alcohol. The alcohol mixture was heated to boiling and boiled for one-half hour. The alcohol was then removed by decantation and the solid residue air-dried. The polymer when treated with diazotized meta-amino phenyl trimethyl ammonium chloride gave a red dyestuff.

From the foregoing examples, it is evident that variations of the reacting materials may yield a wide range of dye-forming polymeric compounds. For example, reactants may be chosen so that: in the polymer all the groupings containing reactive methylene radicals and all the linkage groups are identical, or the reactive methylene and associated groups are identical but the linkage groups between them are different, or the linkage groups are similar but the groups containing reactive methylenes are different, or both the linkage groups and the groups containing reactive methylene radicals may be dissimilar, respectively. Highly complex interpolymers and polymers with straight and branched side chains can be obtained by incorporating more than 2 linkage groups in one or more of the reactants as shown in the following general formulae:

I 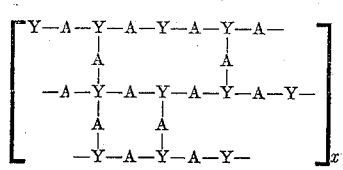

II 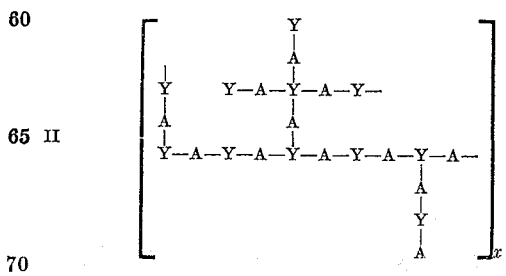

Where (A) indicates a linkage group and (Y) is a grouping containing a reactive methylene radical.

While the invention is concerned with the use of polymers containing recurring units having acyclic reactive methylene groups, the polyamides containing such groups are preferred. They may be prepared from amino-aceto-acetic acid compounds by inter-molecular self-amidation or preferably from poly- especially bifunctional amines and bifunctional amide forming reagents. In place of the specific polyamino compounds of the above examples may be substituted in similar molecular amounts to give other related polymeric dye intermediates, the following amines:

trimethylene diamine
tetramethylene diamine
pentamethylene diamine
decamethylene diamine
tridecamethylene diamine
octadecamethylene diamine
3-methyl-1,6-diaminohexane
2,5-dimethyl-1,6-diaminohexane
tetraglycol diamine
piperazine
N,N' dimethyl-hexamethylene diamine
1,11 diamino-6-ketohendecane
3,5 diaminoacetophenone
diaminotetralone
1,5 diamino-3-pentanone
1,3 diamino propanol 2
metaphenylene diamine
diaminopyridine
benzidine
dianisidine
diaminonaphthalene
2,3, diaminodiphenylamine
o-phenylene diamine
o-tolidine
2-' diaminobenzo-bis-thiazole
1-2-4 triaminobenzene and its 1,3,5-isomer
spermidin
spermin
dimethyl o-, m- and p-phenylene diamines Similarly, in place of the amino compounds of the examples, can be substituted in like molecular amounts, the following hydrazines:

4,4'-diphenyl bis hydrazine
4,4'-bis (B hydrazino)-3,3'-dimethoxy diphenyl
3.3'-dihydrazino-4,4'-dihydroxy diphenyl
1,4-dihydrazino-9,10-dihydroxy anthracene
1.5-dihydrazino-anthraquinone
4,8-dihydrazino-1,5-dihydroxy-anthraquinone
4,4'-dihydrazino-diphenyl-3,3'-dicarboxylic acid
4,4'-dihydrazino-diphenyl-disulfonate (2,2')
4,4'-dihydrazino-3,3-dimethyl - diphenyl - disulfonate (6.6')
4,4'-dihydrazino-stilbene-disulfonate (2,2')

The invention is not limited to the specific diazo compounds and solutions described above. On the contrary, the diazo solutions used in preparing individual azo dyes may be prepared from many primary amines other than those used in the above examples. Amines which are suitable for diazotizing and coupling to azo dyes are well-known in the art (see Fierz-David "Kunstliche Organische Farbstaffe" and J. C. Cain "The Chemistry of the Diazo Compounds," pages 6–26). These are of the general type RNH₂, where R is an aromatic or a heterocyclic ring such as pyridine, pyrazolone, etc. The R may also be substituted with various groups such as halogen, alkyl, alkoxy, aryl, sulfonic, carboxyl, nitro, etc. Suitable diazotized compounds include:

diazotized aniline
diazotized para-nitraniline
diazotized sulphanilic acid
diazotized m-xylidine
diazotized o-toluidine
diazotized aminoazo benzene sulfonic acid
diazotized 2-naphthylamine 6:8 disulfonic acid
diazotized 2-naphthylamine 3:6 disulfonic acid
tetrazotized benzidine
tetrazotized o-tolidine
tetrazotized diaminostilbene disulfonic acid
tetrazotized diaminoazoxybenzene
tetrazotized 1:5-naphthylene diamine 3:7 disulfonic acid
tetrazotized diaminoazoxy toluene In choosing the amine for photographic color processes there are in general two considerations to be observed, (1) the diazo compound must be sufficiently active to couple readily with the dye intermediate used at a relatively low temperature and in aqueous solution, (2) the diazo compound must be one which can be coupled to yield bright azo dyes with spectral characteristics suitable for use in three-color photography, that is, they must have fairly definite and sharp absorption bands. Thus, the most suitable amines are those containing halogen, alkoxy, nitro, carboxy, and sulfonic acid groups.

Similarly, the invention is not limited to the use of the specific primary aromatic amines for the oxidation coupling procedures. Other color coupling developing agents, for example, can be substituted in the procedures of Examples III, IV, V, XII, and XIV in like manner. Suitable additional color coupling developing agents include:

asymmetric diethyl p-phenylenediamine hydrochloride
asymmetric dimethyl p-phenylenediamine hydrochloride
asymmetric dipropyl p-phenylenediamine hydrochloride
meta-methyl as-diethyl p-phenylenediamine hydrochloride
asymmetrical methyl, ethylol p-phenylenediamine
meta-methyl as-butyl, ethylol p-phenylenediamine
m-methyl as-diethylol p-phenylenediamine Still others are described in U. S. Patents 2,262,055, 2,163,820, and British Patent 541,649.

The novel polymeric dye intermediates having recurring acyclic active methylene groups may be used in processes of color photography wherein the color yielding elements contain light sensitive layers or reducible salt layers composed of simple or mixed silver halides which may contain the usual sensitizers, desensitizers, stabilizers, fog inhibitors, emulsion hardeners, etc. Suitable types include silver chloride, silver bromide, silver chlorobromide, silver chloride - bromide - iodide, silver bromide-iodide, silver ferrocyanide, etc., which may contain cyanine, kryptocyanine, merocyanine, rhodanine, etc. salts and bases.

The reactive acyclic methylene grouping of the polymers can be activated by a number of different organic radicals adjacent thereto, for example, a methylene group lying between two adjacent carbonyl groups, a methylene group lying between a carbonyl group and a thioether group, etc. In the following list of activating groups or elements it is assumed in each case that the adjacent reactive methylene is in turn adjacent to another activating group, (i. e., if thioether groups —S— is named as an activating element, it is assumed that the methylene group which it activates is also adjacent to another activating group on the other side such as carbonyl in the following partial formula:

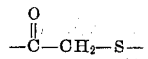

As suitable activating groups there may be mentioned: carbonyl groups, thioether groups, ester groups, amide groups, various heterocyclic groups, viz: oxazoles, thiazoles, selenazoles, benzoxazoles, benzthiazoles, benzoselenazole nuclei, etc., para-nitrophenyl groups, nitro groups and adjacent aromatic groups such as occur in fluorene, etc.

A number of dye intermediates described above are new compounds and may be used for dyeing the most varied materials such as vegetable fibers, animal fibers, for example, silk and wool, leather, or artificial fibers, such as regenerated cellulose, linear polymers of the nylon type and cellulosic derivatives by development with diazo compounds. For dyeing operations suitable water-soluble or water-insoluble intermediates may be chosen depending upon the application intended. Thus, different intermediates may be dissolved in water, alcohols, and organic solvents such as ethers. The novel compounds may also be used for printing pastes and padding materials for the types of textile dyeing which employ such agents. Such intermediates may be employed to produce dyes and pigments in stains, lacquers, and varnishes of a natural or synthetic nature and as coloring agents for inks in paste, powder, or liquid form. They may also be used as substitutes for resin and softener constituents in lacquer compositions and may be used by themselves with suitable solvents and plasticizers for special enamel compositions. In combination with resins such as Bakelite, phenol-formaldehyde, and rosin or oil modified polyhydric alcohol-polybasic acid condensation products these intermediates afford means of coloring these materials and of modifying their physical characteristics, such as elasticity, toughness, etc.

The novel polymeric intermediates having recurring acyclic active methylene groups hereof are useful for incorporation in thermoplastic resins, artificial and synthetic rubbers, and similar materials, because they withstand the operating temperatures well and in the case of many such materials enter into chemical combination with the bases used. Certain of the novel dye intermediates are valuable coating and impregnating materials for paper, cloth, leather, and other pliable sheet materials. For such uses they may be mixed with pyroxylin and various softeners such as cotton seed oil, castor oil, tricresyl phosphate, acetyl laurin, etc. Either alone or in combination with cellulose derivatives, natural resins such as rosin, damar, Congo, Pontianac, and Manila gums; and/or synthetic resins such as phenol-formaldehyde, urea-formaldehyde, acetone formaldehyde, and polyhydric alcohol-polybasic acid derivatives, the compounds of this invention may be used in the preparation of fibers, films, foils, and extruded or molded solid or semi-solid shapes. In addition, these compounds may be used in the perparation of biological stains, dyes for hair, flesh, bone and ivory, and in suitable solvents for the preparation of embalming fluids and taxidermic preservatives. As pigments or as stains, the compounds of this invention may be used to impart color and/or finish to stone, wood, metal, ceramics, and inorganic molding compounds.

One of the advantages of the invention is that it provides non-migratory color-forming intermediates for use in color-coupling development in photography. A still further advantage is that the polymeric materials provide self-supporting films capable of coupling with dye forming substances to produce colored films, foils, etc. The compounds of the invention may further be advantageously combined with light sensitive silver halides as substitutes for gelatin in the preparation of light sensitive photographic layers for color photography.

As many apparently widely different embodiments of this invention may be made without departing from the spirit and scope thereof, it is to be understood that the invention is not limited to the specific embodiments thereof except as defined in the appended claims.

I claim:

1. A photographic element comprising a support bearing at least one water-permeable colloid layer containing light-sensitive silver halides and a polymeric color former containing recurring structural units of the formula:

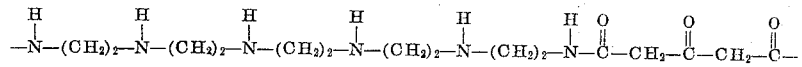

2. A photographic element comprising a support bearing at least one water-permeable celloid layer containing light-sensitive silver halides and a stratum containing a polymeric color former containing recurring structural units of the formula:

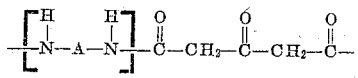

wherein A is the remaining nucleus of a polyamine, wherein the nitrogen atom shown are terminal nitrogen atoms of such amine and the free bonds attached to the nitrogen and carbon atoms respectively, are joined in chain fashion.

3. A photographic element comprising a support bearing at least one water-permeable colloid layer containing light sensitive silver halides and a polymeric color former containing recurring structural units of the formula:

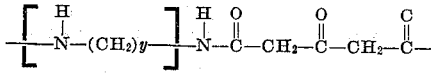

wherein $y$ is an integer of 1 to 5 and the free bonds attached to the nitrogen and carbon atoms are joined in chain fashion.

4. A photographic element comprising a support bearing at least one water-permeable colloid layer containing light sensitive silver halides and a stratum containing a polymeric color former containing recurring structural units of the formula:

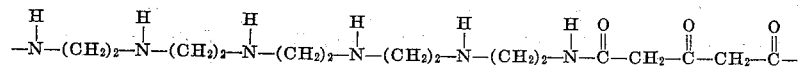

CYRIL D. WILSON.

(References on following page)

REFERENCES CITED

The following references are of record in the file of this patent:

UNITED STATES PATENTS

| Number | Name | Date |
|---|---|---|
| 1,505,568 | Laska | Aug. 19, 1924 |
| 1,762,022 | Laska | June 3, 1930 |
| 1,933,431 | Henle | Oct. 31, 1933 |
| 2,071,252 | Carothers | Feb. 16, 1937 |
| 2,130,523 | Carothers | Sept. 20, 1938 |
| 2,130,948 | Carothers | Sept. 20, 1938 |
| 2,178,612 | Schneider et al. | Nov. 7, 1939 |
| 2,179,234 | Schneider | Nov. 7, 1939 |
| 2,179,239 | Wilmans | Nov. 7, 1939 |
| 2,186,734 | Schneider | Jan. 9, 1940 |
| 2,186,735 | Schneider et al. | Jan. 9, 1940 |
| 2,218,439 | Rothrock | Oct. 15, 1940 |
| 2,280,722 | Schneider et al. | Apr. 21, 1942 |
| 2,289,805 | Porter et al. | July 14, 1942 |
| 2,294,909 | Jennings | Sept. 8, 1942 |
| 2,297,732 | Woodward | Oct. 6, 1942 |
| 2,307,399 | Frohlich et al. | Jan. 5, 1943 |

FOREIGN PATENTS

| Number | Country | Date |
|---|---|---|
| 458,664 | Great Britain | Dec. 21, 1936 |